United States Patent [19]
Larson

[11] Patent Number: 5,854,614
[45] Date of Patent: Dec. 29, 1998

[54] DISPLAY DEVICE AND METHOD FOR VISUALIZING COMPUTER GENERATED IMAGE INFORMATION

[75] Inventor: Ove Larson, Västra Frölunda, Sweden

[73] Assignee: Array Printers AB Publ., Vastra Frolunda, Sweden

[21] Appl. No.: 749,958

[22] Filed: Nov. 18, 1996

[51] Int. Cl.$^6$ .................................................. G09G 3/36
[52] U.S. Cl. ............................ 345/90; 345/101; 345/106
[58] Field of Search .................................. 345/55, 60, 67, 345/69, 90, 91, 101, 106

[56] References Cited

U.S. PATENT DOCUMENTS

| | | |
|---|---|---|
| 3,354,565 | 11/1967 | Emmons et al. . |
| 3,410,399 | 11/1968 | Hunter . |
| 3,637,291 | 1/1972 | Kesler et al. . |
| 3,877,008 | 4/1975 | Payne . |
| 3,897,643 | 8/1975 | Morris, Jr. et al. . |
| 4,277,145 | 7/1981 | Hareng et al. . |
| 4,501,503 | 2/1985 | Buirley et al. . |
| 4,514,045 | 4/1985 | Huffman et al. . |
| 4,525,708 | 6/1985 | Hareng et al. ........................ 345/101 |
| 4,598,978 | 7/1986 | Mourey et al. . |
| 4,641,924 | 2/1987 | Nagae et al. . |
| 4,673,256 | 6/1987 | Hehlen et al. . |
| 4,682,605 | 7/1987 | Hoffman . |
| 4,922,242 | 5/1990 | Parker ........................ 345/106 |
| 4,995,705 | 2/1991 | Yoshinaga et al. . |
| 5,040,879 | 8/1991 | Haven . |
| 5,128,662 | 7/1992 | Failla ........................ 345/1 |
| 5,140,448 | 8/1992 | Bone et al. . |
| 5,144,464 | 9/1992 | Ohnishi et al. . |
| 5,202,677 | 4/1993 | Parker et al. . |
| 5,296,952 | 3/1994 | Takatsu et al. . |
| 5,343,318 | 8/1994 | Basturk . |
| 5,486,941 | 1/1996 | Saiuchi et al. . |
| 5,548,420 | 8/1996 | Koshimizu et al. . |
| 5,620,781 | 4/1997 | Akashi et al. . |

FOREIGN PATENT DOCUMENTS

| | | |
|---|---|---|
| 2349234 | 6/1974 | Germany . |
| 63-29795 | 1/1990 | Japan ........................ 345/106 |
| 357879 | 11/1973 | Sweden . |
| 396826 | 2/1976 | Sweden . |
| 1330420 | 9/1973 | United Kingdom . |
| 1453984 | 10/1976 | United Kingdom . |
| WO 92/01565 | 7/1991 | WIPO . |
| WO 94/26528 | 5/1995 | WIPO . |

*Primary Examiner*—Matthew Luu
*Attorney, Agent, or Firm*—Knobbe, Martens, Olson & Bear, LLP

[57] ABSTRACT

An information display device including, as main components, a thermosensitive material layer which can be gradually converted between a completely opaque state and a completely transparent state under the influence of temperature, an electrode matrix, a control device for multiplexing, scanning or pulsating control signals to the individually addressable electrodes, possibly together with a colored backing layer. The electrodes in the matrix are connected via heating means at the electrode crossing points. At each crossing point there is further positioned a current valve means (diode) or a separate driver circuit for each heating means.

10 Claims, 2 Drawing Sheets

DISPLAY DEVICE AND METHOD FOR VISUALIZING COMPUTER GENERATED IMAGE INFORMATION

BACKGROUND OF THE INVENTION

The present invention relates to an information display medium and a method for visualizing computer generated image information.

It is known in the art to write visual information on a thermosensitive display medium, where the medium becomes transparent when heated and opaque when cooling down or heating above a certain temperature. The thermosensitive material of such a medium is also referred to as a thermochromic material. The visualization material used in thermosensitive displays are generally liquid crystals, for example encapsulated liquid crystals, which become transparent when being heated, thus enabling incident light to be transmitted through the medium.

The international patent application WO 94/26528 discloses a display for the visualization of still or moving images, where temperature changes are produced in a pattern of resistive elements and transformed to visible dots in a visualization medium. The display consists of a matrix, having at least two sets of electrodes which sets cross each other and are distanced from each other by means of at least one resistive and/or inductive spacer means. The electrodes are arranged in rows and columns, which do not necessarily have to be perpendicular to each other. The matrix is further connected to at least one control device for multiplexing, scanning or pulsating the control signals. The electrodes are individually addressable according to the electric signals from the control unit and arranged so that, when the selected electrodes in both sets of electrodes are energized, a temperature change is obtained at the cross point of the charged electrodes. This temperature change (heat) is conducted towards the display medium, which comprises a thermosensitive indication means, such as a layer, a body or the like. The surface(s) of the display then transform(s) the temperature change to visible dots or the like.

In U.S. Pat. No. 4,837,071 there is disclosed an information display medium comprising a thermosensitive material layer which can reversibly repeat turbid (opaque) and transparent conditions by being heated to different temperatures and can keep one of said conditions stably below a particular temperature. The thermosensitive material layer is backed by a colored layer, another layer and a background panel. At least one of the mentioned layers is colored in different color patterns. The temperature of the thermosensitive material layer is controlled for displaying an image in a combination of different colors.

The document WO 92/01565 discloses an erasable optical display medium for colored visual information, which display medium comprises a substrate carrying a heat-sensitive film which can be converted to different optical states (opaque/transparent) under the influence of temperature. These states are permanent at normal ambient temperature (room temperature) and reversible by heating to specific temperatures. The display medium is designed to have a matrix of dots, the dots being combined into groups of four dots, where each of the four dots have a different primary color (e.g. red, yellow, blue or black). If the heat-sensitive film over a dot is converted, by appropriate warming, to the transparent state, the dot underlying the film becomes visible. This makes it possible to display colored data on the display medium.

SUMMARY OF THE INVENTION

It is an object of the present invention to provide an information display device and a method for visualizing computer generated image information, whilst minimizing the energy used for this process.

A further object of the invention is to provide an information display device for visualizing computer generated image information, which is capable of displaying an image using gradual color- or grey-scales.

To achieve these objects, an information display device according to the present invention includes as main components a thermosensitive material layer which can be gradually converted between a first optic state and a second optic state under the influence of temperature, an electrode matrix, a control device for multiplexing, scanning or pulsating control signals to the individually addressable electrodes, possibly together with a colored backing layer. The electrodes in the matrix are connected via heating means at the electrode crossing points. At each crossing point there is further positioned a current valve means (diode) or a separate driver circuit for each heating means.

The above and other objects, features and advantages of the present invention will become more apparent from the following description when read in conjunction with the accompanying drawings in which preferred embodiments of the present invention are shown by way of illustrative examples.

DETAILED DESCRIPTION OF PREFERRED EMBODIMENTS

Figure 1:
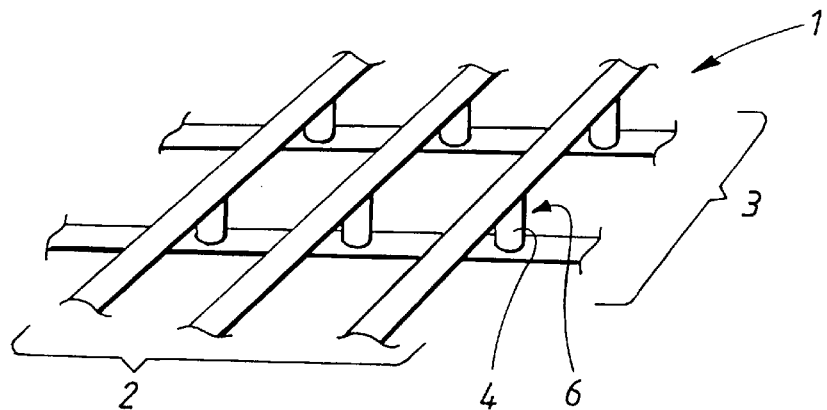
FIG. 1 is a fragmentary perspective view of an information display device according to the invention.
Figure 2:
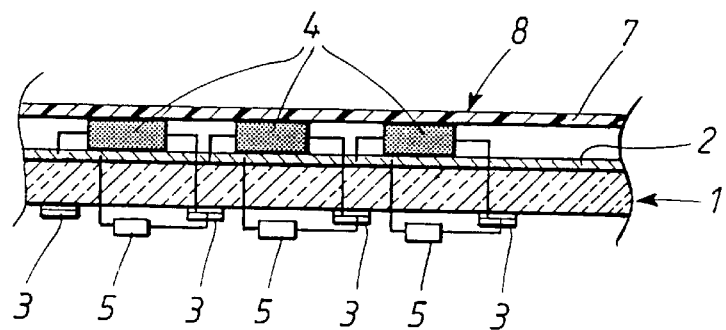
FIG. 2 is a cross-sectional view of an information display device according to the invention.

An information display device according to the invention is shown in FIG. 1 and 2. The device comprises a matrix 1 of a first set of electrodes and a second set of electrodes. These sets of electrodes are connected to control means (not shown) for multiplexing, scanning or pulsing electric signals to the electrodes. A heating means 4 electrically connects the two electrode sets where one electrode from each of the two electrode sets cross each other, defined as the cross point 6. A thermosensitive layer 7, being capable of changing state from a first optic state to a second optic state depending upon its temperature, is arranged in contact with the matrix 1. The first optic state is, for example, a completely opaque material or a material of a certain first color. The second optic state is, for example, a completely transparent material or a material of a certain second color, different from the first color.

An information display device according to the invention is shown in FIG. 1, where a matrix 1 of electrodes, consisting of a layer of rows 2 and a layer of columns 3 of electrodes having a resistive and/or inductive heating means 4 electrically connected between the two electrode layers, is connected to a not shown control device for multiplexing, scanning or pulsating control signals to the individually addressable electrodes. The sets/layers 2, 3 of electrodes are consequently arranged in X and Y coordinates, but the X-axis and the Y-axis do not necessarily have to be perpendicular to each other. Each electrode in a layer is individually connected to a control means, e.g. integrated driving circuits. Heat is generated within a limited space in the heating means 4, at the cross point 6 of two current carrying electrodes from opposite layers, i.e. one electrode from the row layer 2 and one from the column layer 3. The heat generated at the electrode cross point 6 is distributed to the heating surface 8 of the matrix, while its opposite surface advantageously is insulated against heat transfer by means of a not shown insulation plate. On the heating surface 8 of the matrix there is arranged a thermosensitive layer 7, which can be gradually converted from a completely opaque state to a completely transparent state under the influence of temperature. There is either a colored layer (not shown) between the matrix and the thermosensitive layer 7 or the matrix 1 itself is colored, for example by coloring the heating means 4 or applying a separate not shown colored layer between the matrix 1 and the thermosensitive layer 7, to provide a color background which becomes visible when the thermosensitive layer 7 is in a state of transparency, thus producing different colored dots on the display.

To prevent the current from flowing in any other direction than from one current carrying electrode of the first set, via the heating means 4, to the corresponding electrode in the second set, a diode 5 is arranged at each of said cross points 6 and in parallel with the heating means 4. An alternative embodiment comprises not shown driving means, arranged at each of said cross points 6, where the driving means energize only the corresponding heating means 4.

Figure 3:
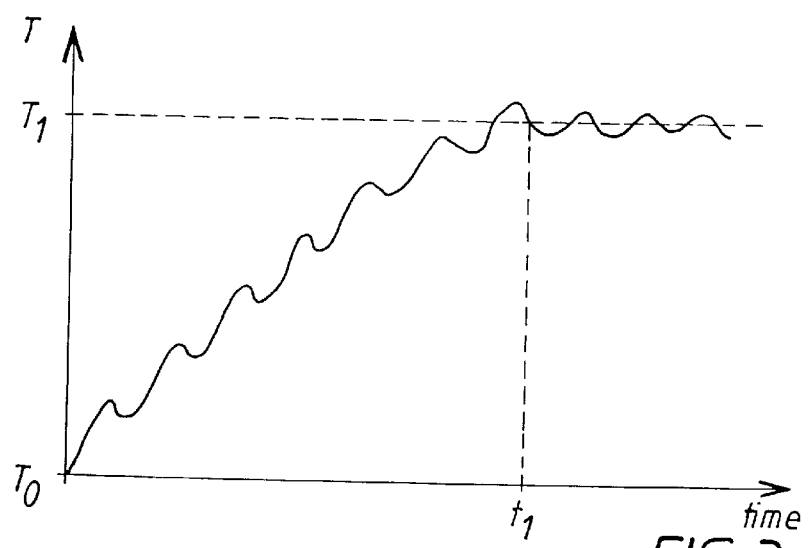
FIG. 3 is a graph showing a heating method according to the invention.

The thermosensitive layer 7 is heated to any intermediate temperature between the temperature at which the thermosensitive layer is fully opaque and the temperature at which the thermosensitive layer is fully transparent by means of controlling the amount of heat generated by the heating means 4. The amount of heat generated by the heating means 4 is built up, during a heating phase, by sending a plurality of low voltage/short duration pulses of electric current to the individual electrode via the control means, and, when the desired temperature is reached, maintaining this temperature with pulses which are spaced apart further in time compared to the first build-up phase pulses, which procedure is represented in the diagram shown in FIG. 3. Each peak on the curve indicates a current pulse. To raise the temperature from $T_0$ to $T_1$, relatively frequent pulses are sent to the electrode. When the temperature $T_1$ has been reached, at the time $t_1$, the temperature is held sufficiently constant by sending pulses less frequently. The control voltage to the electrodes can thus be pulsated, i.e. each selected crossing point 6 is pulsated with an amount of energy per time unit, so that its heat remains substantially constant until the next screen update. Using this method, by modulating the pulse trains, there is no need to modulate the voltage to the electrodes. The pulsating can be done by addressing each point continuously with voltage and/or current pulses, switching on/off the dot by changing the dot address or multiplexing or scanning. The scanning of heating means 4 can be performed either sequentially, i.e. each row of electrodes is scanned in sequence, or non-sequentially, when every n:th row is scanned and then, after completing the whole display sheet, every n:th plus one row etc.

Figure 5A:
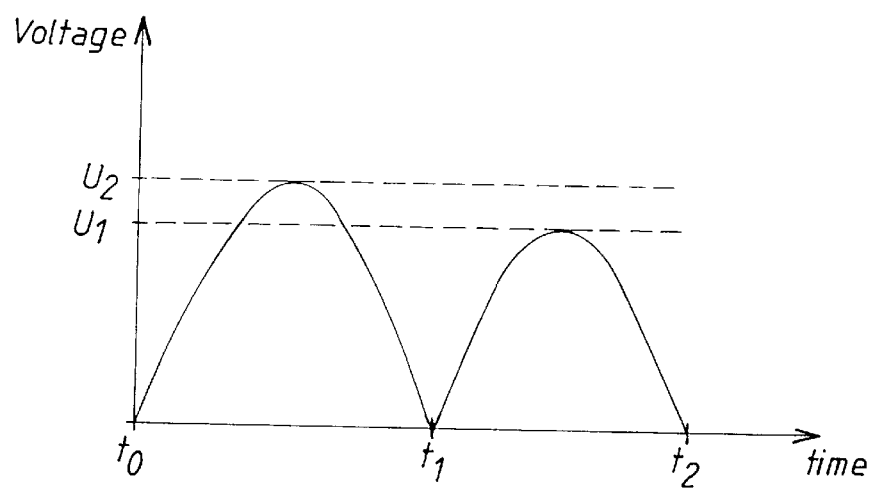
FIG. 5a is a graph showing voltage modulated pulses according to the invention.
Figure 5B:
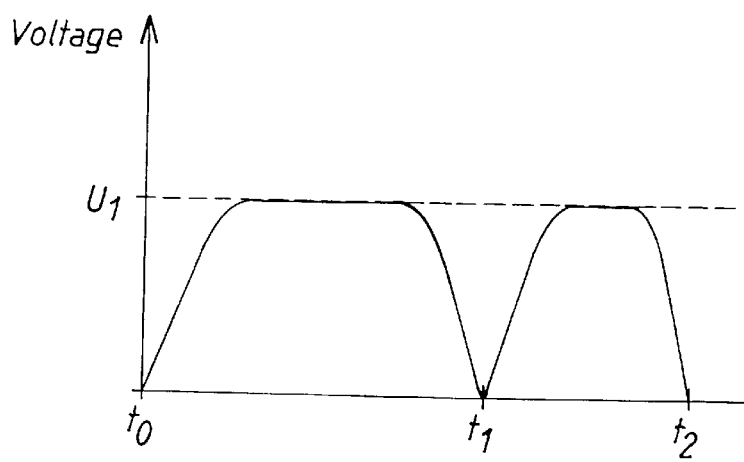
FIG. 5b is a graph showing duration modulated pulses according to the invention.

The pulse can, alternatively, be modulated by amplitude or pulse width, as is shown in FIG. 5a and 5b. As is evident from FIG. 5a, two pulses of the same time duration, i.e. $t_1-t_0$ equals $t_2-t_1$, can have two different maximum pulse voltages, $U_1$ and $U_2$ respectively, whereby the energy given off as heat in the heating means 4 is controlled by varying the maximum pulse voltage. In FIG. 5b, an alternative method is shown in which two pulses have the same maximum pulse voltage, $U_1$, but have different durations, in the shown example $t_1-t_0$ is greater than $t_2-t_1$. The energy given off as heat in the heating means 4 is thus controlled by varying the pulse width, i.e. the time during which the voltage is fed through the heating means 4.

Figure 4:
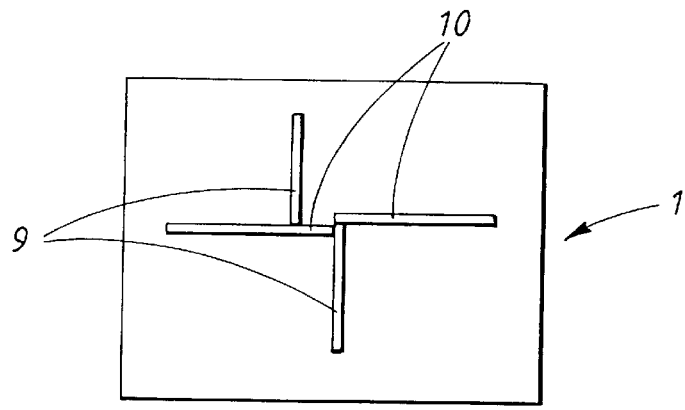
FIG. 4 is a plan view of the side of the matrix on which terminal strips are arranged.

To minimize current consumption, the electrode sets are fed electrical current from terminal points situated at a center section of the matrix, as is shown in FIG. 4. A preferred location is on the opposite side of the matrix compared to where the thermosensitive layer 7 is arranged. Terminal strips 9 feed the electrode rows 2 and terminal strips 10 feed the electrode columns 3.

The heating means 4 are, for instance, made as discrete resistors, a restriction in the electrode itself or doped areas in a substrate. It is also possible to use Peltier cells, which have the added advantage of allowing accelerated cooling of the thermosensitive layer 7. The whole assembly, matrix and any possible additional layers, is preferably made flexible, for example for rolling up the assembly for efficient storage.

The information display devices, as previously described, are advantageously arranged as a multitude of information display devices, in one plane and with all devices facing the same direction with their respective thermosensitive layers, thus providing large size display boards all sharing the same image control device.

Although certain preferred embodiments have been shown and described, it should be understood that changes and modifications may be made thereto without departing from the scope of the appended claims.

I claim:

1. An information display device, comprising a matrix, said matrix comprising:

a first set of electrodes and a second set of electrodes, said first and second sets being connected to control means for multiplexing, scanning or pulsing electric signals to the electrodes;

a plurality of heating means electrically connected between said first and second electrode sets at each cross point between electrodes from each of said first and second electrode sets;

a thermosensitive layer being capable of changing state from opaque to transparent depending upon its temperature, said thermosensitive layer being arranged in thermal contact with said heating means, wherein said matrix further comprises a plurality of diodes, with a diode being arranged at each of said cross points so that a current can only flow from one current carrying electrode of the first set, via said heating means, to the corresponding electrode in the second set.

2. An information display device, comprising a matrix, said matrix comprising:

a first set of electrodes and a second set of electrodes, said first and second sets being connected to control means for multiplexing, scanning or pulsing electric signals to the electrodes;

a plurality of heating means electrically connected between said first and second electrode sets at each cross point between electrodes from each of said first and second electrode sets;

a thermosensitive layer being capable of changing state from opaque to transparent depending upon its temperature, said thermosensitive layer being arranged in thermal contact with said heating means, wherein said matrix further comprises a plurality of driving means, a driving means being arranged at each of said cross points, each said driving means energizing only its corresponding heating means.

3. An information display device comprising a matrix, said matrix comprising:

a first set of electrodes and a second set of electrodes, said first and second sets being connected to control means for multiplexing, scanning or pulsing electric signals to the electrodes;

a plurality of heating means electrically connected between said first and second electrode sets at each cross point between electrodes from each of said first and second electrode sets;

a thermosensitive layer being capable of changing state from opaque to transparent depending upon its temperature, said thermosensitive layer being arranged in thermal contact with said heating means;

wherein said matrix further comprises a plurality of diodes, with a diode being arranged at each of said cross points so that a current can only flow from one current carrying electrode of the first set, via said heating means, to the corresponding electrode in the second set; and wherein said electrode sets are fed electrical current from terminal points situated at a center section of said matrix.

4. A method of arranging information on an information display device, said device comprising a matrix, said matrix further comprising:

a first set of electrodes and a second set of electrodes, said first and second sets being connected to control means for multiplexing, scanning or pulsing electric signals to the electrodes;

a plurality of heating means electrically connected between said first and second electrode sets at each cross point between electrodes from each of said first and second electrode sets;

a thermosensitive layer being capable of changing state from opaque to transparent depending upon its temperature, said thermosensitive layer being arranged in thermal contact with said heating means, wherein said thermosensitive layer is heated to any intermediate temperature between a temperature at which said layer is fully opaque and a temperature at which said layer is fully transparent by means of controlling the amount of heat generated by said heating element.

5. A method of arranging information on an information display device, said device comprising a matrix, said matrix further comprising:

a first set of electrodes and a second set of electrodes, said first and second sets being connected to control means for multiplexing, scanning or pulsing electric signals to the electrodes;

a plurality of heating means electrically connected between said first and second electrode sets at each cross point between electrodes from each of said first and second electrode sets;

a thermosensitive layer being capable of changing state from opaque to transparent depending upon its temperature, said thermosensitive layer being arranged in thermal contact with said heating means;

wherein said thermosensitive layer is heated to any intermediate temperature between a temperature at which said layer is fully opaque and a temperature at which said layer is fully transparent by means of controlling the amount of heat generated by said heating element; and wherein the amount of heat generated by said heating element is built up, during a heating phase, by sending a plurality of low voltage and short duration pulses of electric current to the individual electrode via the control means and, when the desired temperature is reached, maintaining this temperature with pulses which are spaced apart further in time compared to the first build-up phase pulses.

6. The method according to claim 5, wherein the amount of heat generated by said heating element is controlled by varying the maximum pulse voltage of successive pulses.

7. The method according to claim 5, wherein the amount of heat generated by said heating element is controlled by varying the pulse duration of successive pulses.

8. An information display device comprising a matrix, said matrix comprising:

a first set of electrodes and a second set of electrodes, said first and second sets being connected to control means for multiplexing, scanning or pulsing electric signals to the electrodes;

a plurality of heating means electrically connected between said first and second electrode sets at each cross point between electrodes from each of said first and second electrode sets;

a thermosensitive layer being capable of changing state from opaque to transparent depending upon its temperature, said thermosensitive layer being arranged in thermal contact with said heating means;

wherein said matrix further comprises a plurality of driving means, a driving means being arranged at each of said cross points, each said driving means energizing only its corresponding heating means; and wherein said electrode sets are fed electrical current from terminal points situated at a center section of said matrix.

9. The method of claim 5, wherein the matrix further comprises a plurality of diodes, with a diode being arranged at each of said cross points so that a current can only flow from one current carrying electrode of the first set, via said heating means, to the corresponding electrode in the second set.

10. The method of claim 5, wherein said electrode sets are fed electrical current from terminal points situated at a center section of said matrix.

* * * * *